Patented Oct. 14, 1941

2,259,225

UNITED STATES PATENT OFFICE 2,259,225

COLORING COMPOSITION FOR TEXTILES

Roy H. Kienle, Bound Brook, and Alfred L. Peiker, East Bound Brook, N. J., assignors, by mesne assignments, to American Cyanamid Company, New York, N. Y., a corporation of Maine No Drawing. Application September 8, 1938, Serial No. 228,922

9 Claims. (Cl. 8—62)

This invention relates to printing and coloring of materials and more particularly, to the coloring and printing of textile fabrics.

The printing and dyeing of fabrics has usually been effected by treatment of the fabric with a printing paste or a dye bath in which a soluble or insoluble form of coloring matter is dispersed. Another procedure is to print or impregnate a fabric with one component capable of forming a color and then printing with the other component which reacts therewith under suitable conditions to produce the color. These processes are generally wasteful of color since usually only a portion thereof adheres to the fiber. Frequently, these processes do not give as sharp outlines as might be desired due to creeping or bleeding of the print. In the case where a dye bath is used, it is difficult to exhaust all of the color from the bath.

It has been proposed in the past to print materials with lacquers, that is to say, solutions of various resins either natural or synthetic in organic solvents, coloring matter being dispersed through the solution or dissolved therein. Lacquer printing avoids some of the disadvantages of ordinary printing procedures in that sharp prints are possible and there is little or no waste of coloring matter. This also permits the use of pigment colors which cannot be printed in the ordinary manner. While lacquer printing has the above advantages, it has not been very widely used because of several defects, one being that the film which is formed on evaporation of the lacquer solvent is so stiff that it binds fibers of textile fabrics together to produce a final product that is not flexible and has a harsh feel. The lacquer also produces a surface gloss which is undesirable in many cases. The organic solvents used in the lacquers also add to the expense and introduce a fire hazard.

The present invention avoids the disadvantages of ordinary printing and dyeing processes and of lacquer printing while retaining sharpness of lacquer prints. According to the present invention, an aqueous dispersion which may be a solution or an emulsion of a water soluble alkyd resin is used as the color carrying vehicle. The dispersion permits the production of sharp prints with all the clarity and color economy of lacquer prints, but does not unduly stiffen goods. It is also possible to color many other materials such as transparent sheet stock, paper, and the like. An added advantage is that the finish of the present invention can be set by heat to produce a finish having greater resistance to washing and the like, and an increase in color fastness is also noted in the case of some of the more fugitive colors.

The absence of undue stiffening when textile fabrics are printed is probably due at least in considerable measure to the fact that the resin in printing does not tend to bridge from fiber to fiber and produce a stiff material having the feel of painted fabric, but instead appears to coat individual fibers so that the printed or coated material is still sufficiently flexible to be used for all normal purposes and does not have a harsh or unpleasant feel.

The water soluble alkyd resin of the present invention may be of any of the water soluble polyglycol types such as the maleates, itaconates, and the like, the invention not being limited to any particular water soluble alkyd resin. The resin may be present alone or it may be modified with plasticizers or other resinous material capable of dispersion in water.

The nature of the color may vary widely and this is an advantage of the present invention. Thus, for example, various water soluble dyes which may or may not have affinity for the fiber itself may be used. Any insoluble colors such as organic or inorganic pigments may also be used, and it is an advantage of the present invention that prints are no longer restricted to colors which can be attached to the fiber in a soluble form. This not only greatly widens the field of useful colors but likewise permits marked economies because many of the pigment colors, otherwise difficult to use, such as ultramarine, the phthalocyanine pigments, lake colors such as phosphotungstic and phosphomolybdic lakes of basic dyestuffs can now be successfully applied.

Colors may also be incorporated which are formed by causing a colored component to react with the resin to yield colored resin complexes. The use of these complexes in the present invention permits the production of extremely uniform colors because the resin film itself is colored.

The fact that the coloring matter may be employed in the form of an insoluble pigment also permits the use of very large numbers of mixtures since it is not necessary in every case to use compatible colors. Thus, for example, by the printing process of the prior art, it would not be possible to use mixtures of colors which must be developed with pigments which do not need development. By the process of the present invention, any mixtures can be employed so long as one color does not react chemically with the other in aqueous dispersion to produce undesirable effects.

Since the present invention does not depend on any apparent chemical reaction with the material coated or physical or chemical affinity of the color therefor, it is usable with success on a wide variety of materials. Thus, for example, fabrics of cotton, rayon, pigmented rayon, cellulose acetate, saponified acetate, silk, wool, and various mixtures may be employed. The invention is also useful for printing or coloring materials such as rubber base automobile upholstery cloth and the like. The invention may be used also in coloring paper which may be sized or unsized, or which may be given coatings of various materials.

An added advantage of the present invention is that the prints made thereby are resistant to stiffening processes such as the use of solutions of cellulose acetate which are being employed to a large extent for stiffening of fabrics either locally or throughout; for example, the stiffening of shirt collars, cuffs, etc. The invention is also applicable to materials which have been creaseproofed by any of the standard processes now employed. Due to the fact that it is not necessary for the color to have a particular affinity for the fiber, it is also possible to employ the present invention for the coloring of glass threads or ribbons or spun glass fabrics. The substantial absence of bridging from fiber to fiber which is so serious a drawback with lacquer printing also permits the embodiment of the present invention on webbed elastic material since the prints do not crack when the material is stretched.

The emphasis has been placed above on the use of the present invention for printing because it is in this field that the economic advantages of the present invention are particularly striking since here the saving in color and the use of colors which cannot be employed effectively in the ordinary printing processes are especially marked. However, the invention is not in any sense limited to a printing process. On the contrary, it may be used for coloring materials by coating the whole surface with a solid color. The process of the present invention is also useful for procedures in which a plurality of operations are involved. Thus, for example, a material can be colored a solid color by the present invention using vat process similar to ordinary dyeing procedures and then patterns can be printed thereon. It is, of course, possible to use the present invention for printing designs on fabrics or other materials which have been dyed or colored by other processes. The fact that the process of the present invention is substantially independent of the nature of the surface to which the color is to be applied makes this field of usefulness very wide and puts an important flexible tool at the command of the dyer and printer as well as other technologists having problems involving the coating of various materials.

While the present invention may be used with a minimum of additional ingredients, it is often desirable to incorporate printing assistants or other materials modifying color, material surface and the like, and it is an advantage of the present invention that the various textile assistants which have been developed in great number in the past decade may be employed in conjunction with the invention.

The invention will be described in detail in conjunction with a number of specific examples illustrating its applicability to various colors and water soluble alkyd resins. The parts are by weight.

Example 1

50 parts of hexaethylene glycol maleate were thoroughly mixed with 20 parts of a copper phthalocyanine pulp containing 20% solids, together with 30 parts of water, by means of a high speed stirrer.

When this mixture had become reasonably uniform, it was placed in a porcelain pebble mill and ground for 18 hours or until the pigment was evenly dispersed throughout. This mixture was then printed on both cotton and rayon, yielding very sharp, clear, bright blue flexible prints. After curing for one hour at 120° C., the printed patterns were found to have good resistance to washing.

Example 2

80 parts of polyethylene glycol itaconate (the polyethylene glycol calculating as being between hexa and hepta) were mixed with 20 parts of water by means of an electric stirrer. When a uniform solution had been obtained, 3 parts of a water dispersible powder containing 30 parts of a bluish-red pigment, 6,6'-dichloro-4,4'-dimethyl-2,2'-bis-thio-naphthen-indigo, were added thereto and mixed until a fairly uniformly colored suspension was obtained. This suspension was then ground in a Buhrstone paint mill and the resultant color solution printed on cotton. The prints were rather sharp and after curing for 10 minutes at 150° C. were found to be fast to washing and to wet and dry crocking.

Example 3

50 parts of the colored solution described in Example 1 were placed in a vessel, 200 parts of water were added thereto, and the entire mass was agitated until uniformly mixed. This solution was then used to color cotton cloth by passing the cloth through the solution, then through rubber squeeze rolls, and finally drying in an oven at 150° C. for 10 minutes. The cloth was uniformly colored on both sides and the coloring operation did not appear to affect the flexibility of the cloth. This colored piece of goods was found to be fast to washing and to have good resistance to dry crocking.

Example 4

80 parts of an aqueous polyethylene glycol maleate solution (the polyethylene glycol calculating as being between hexa and hepta) containing approximately 83% resin, was thoroughly mixed with 50 parts of water and 1 part of a direct cotton dye, namely, the sodium salt of 3,3'-disulfodiphenylurea-4,4'-disazo-bis - 2 - amino - 8 - naphthol-6-sulfonic acid (C. I. 353). The resulting solution was printed on cotton, producing sharp, clean, bluish-red prints. When 100 parts of this colored resin solution were mixed with 500 parts of water, it was found to color fabrics very uniformly by the pad and jig method. The colored cloths thus obtained, after curing for 5 minutes at 150° C., were found to be fast to washing.

Example 5

80 parts of an aqueous polyethylene glycol maleate solution containing 83 parts of resin were thoroughly mixed with 50 parts of water and 1 part of red iron oxide by means of a high speed stirrer. This mixture was then passed through a Buhrstone paint mill until a uniformly colored suspension was obtained. When printed on cotton fabrics, very sharp, pliable colored patterns resulted which, after curing for 5 minutes at 150° C., were found to be fast to washing and crocking.

Example 6

80 parts of an aqueous polyethylene glycol maleate solution containing approximately 83% resin were thoroughly mixed with 50 parts of water, 1 part of a 5% solution of a Cobalt drier in water, and 1 part of an orange pigment, prepared by diazotizing meta chloraniline and coupling with the ortho toluidide of beta hydroxynaphthoic acid. The mixture was ground in a Buhrstone paint mill, producing a uniformly colored suspension which was then printed on cotton, producing very sharp, rather bright orange prints. After curing for 5 minutes at 150° C., the printed patterns were found to be resistant to both washing and crocking.

Example 7

80 parts of an aqueous polyethylene glycol maleate solution containing 83% resin were mixed with 50 parts of water and 2 parts of Carbon Black by means of a high speed stirrer followed by grinding in a Buhrstone mill. This mixture produced very sharp, clean, gray prints. The prints were found to be fast to washing at the boil after being cured for 5 minutes at 150° C.

Example 8

80 parts of a polyethylene glycol maleate solution containing 83% resin were mixed with 50 parts of water, 10 parts of a water soluble resinous material (Glycol Bori Borate) and 7.5 parts of a water dispersible reddish-blue powder containing approximately 15 parts of the phosphotungstic lake of trimethyl-diamino-fuchson dimethylammonium chloride (C. I. 680), by means of a high speed stirrer followed by grinding in a Buhrstone mill. This mixture was printed on both cotton and silk. After being heat treated for 10 minutes at 150° C., pleasing reddish-blue prints were produced.

Example 9

75 parts of a polyethylene glycol maleate solution containing 83% resin were mixed with 3 parts of oleic acid, 1 part of triethanolamine, and 1 part of lauryl sulfate by means of an exceptionally high speed stirrer. When this mixture became very uniform, 46 parts of a liquid aliphatic hydrocarbon was added slowly thereto and the entire mass whipped into a fairly stable emulsion. To this emulsion was then added 1.5 parts of red iron oxide and the agitation continued until the iron oxide was completely dispersed throughout the emulsion. The emulsion was then ground in a Buhrstone paint mill and further agitated. The final stable emulsion was then printed on pigmented rayon, wool and cellulose acetate. After heat treating for 5 minutes at 150° C., the prints in all cases were found to be fast to washing.

Example 10

3.5 parts of a bluish-red pigment, 6,6'-dichloro-4,4'-dimethyl-bis-thionaphthenindigo, was thoroughly ground into 20 parts of hexa-ethylene glycol maleate resin. After a uniform dispersion resulted, 20 parts thereof were added to 80 parts of water with thorough stirring. A pigment aqueous solution resulted which was printed on cotton and pigmented rayon. After curing for 2 hours at 120° C., the resulting bluish-red prints resisted soaping.

What we claim is:

1. A method of coloring fabric or other porous materials which comprises applying to the materials a colored aqueous dispersion of an oxygen convertible, water soluble alkyd resin.

2. A method of coloring fabric or other porous materials which comprises applying to the materials a colored aqueous dispersion of an oxygen convertible, water soluble alkyd resin and a water soluble color.

3. A method of coloring fabric or other porous materials which comprises applying to the materials a colored aqueous dispersion of an oxygen convertible, water soluble alkyd resin and an organic pigment.

4. A method of coloring fabric or other porous materials which comprises applying to the materials an aqueous dispersion of a colored oxygen convertible, water soluble alkyd resin.

5. A method of printing fabric or other porous materials which comprises applying to the materials a design in the form of a colored aqueous dispersion of an oxygen convertible, water soluble alkyd resin.

6. A method of printing fabric or other porous materials which comprises applying to the materials a design in the form of a colored aqueous dispersion of an oxygen convertible, water soluble alkyd resin and an organic pigment.

7. A method of printing fabric or other porous materials which comprises applying to the materials a design in the form of an aqueous dispersion of a colored oxygen convertible, water soluble alkyd resin.

8. A coloring composition comprising a colored aqueous dispersion of an oxygen convertible, water soluble alkyd resin capable of being used for printing and coloring materials.

9. A coloring composition for coloring materials comprising a colored aqueous dispersion of an oxygen convertible, water soluble alkyd resin containing at least one water insoluble coloring matter in finely divided form.

ROY H. KIENLE.
ALFRED L. PEIKER.